United States Patent Office 3,349,067
Patented Oct. 24, 1967

3,349,067
CATALYST, PREPARATION THEREOF, AND POLYMERIZATION PROCESS UTILIZING SAID CATALYST
Thomas Hill, Falkirk, Scotland, assignor, by mesne assignments, to British Hydrocarbon Chemicals Limited, London, England
No Drawing. Filed Dec. 19, 1962, Ser. No. 245,687
Claims priority, application Great Britain, Dec. 29, 1961, 46,572/61, 46,573/61; Aug. 16, 1962, 31,512/62
13 Claims. (Cl. 260—88.2)

The present invention relates to the preparation of catalytic compositions and the use thereof for the polymerization of olefins.

The use of compositions containing chromium oxide as catalysts for the polymerization of olefins, and especially for the polymerization of ethylene, is well known. Such catalytic compositions have hitherto been prepared by impregnation of a carrier material such as silica or silica/alumina with an aqueous solution of a chromium compound, which is at least partially convertible to the hexavalent chromium oxide by heating in the presence of molecular oxygen, drying of the product, and subsequently activating by heating in a stream of air or oxygen. Reference to U.S. Patent 2,825,721 (1958) is hereby made for further details.

An object of the present invention is to provide an improved catalyst. Another object is to provide an improved process for producing a catalyst. Another object is to polymerize olefins. Still another object is to simplify and accelerate catalyst activation. A further object is to accelerate olefin polymerization. Other objects and advantages will become apparent to those skilled in the art on consideration of this disclosure.

According to the present invention a process of preparing a polymerization catalyst comprises depositing a chromium-containing compound, which is at least partially convertible to the hexavalent chromium oxide by heating in the presence of molecular oxygen, onto a carrier material under substantially anhydrous conditions in the presence of an organic liquid, and subsequently heating the carrier material in the presence of molecular oxygen.

The carrier material may be any suitable material normally employed as a catalyst support in polymerization reactions of this type. Suitable examples include silica, silica gel, silica/alumina or alumina, preferably materials having surface areas in the range 200–700 sq. metres/gm. Materials having surface areas outside this range can also be used. The inert carrier material is preferably dried by heating to 500° to 1000° C. in air, before deposition of the chromium compound. An advantage of the catalyst compositions according to the present invention is that the carrier material may be dried or activated by heat treatment before impregnation, and the use of a high activation temperature, such as is normally required to dehydrate the catalyst after impregnation with an aqueous solution of a chromium compound, is not then essential to produce an active catalyst. Thus pre-treatment of the carrier material, by heating or other means, can be carried out without the necessity of exposing the chromium content of the catalyst to the conditions of the pre-treatment, and the carrier does not have to be exposed to the action of water subsequent to its pre-treatment, as would be required if the conventional aqueous impregnation technique were used.

The chromium-containing compound is deposited onto the carrier material by impregnation or by precipitation. In one aspect, the carrier material is impregnated with an anhydrous organic solvent solution of a chromium-containing compound, which is at least partially convertible to the hexavalent chromium oxide by heating in the presence of molecular oxygen, and the organic liquid is evaporated off leaving the chromium-containing compound deposited on the carrier. In another aspect, an anhydrous solution of a chromium-containing compound in an organic liquid is caused to react so as to form a precipitate, which is at least partially convertible to the hexavalent chromium oxide by heating in the presence of molecular oxygen, and which is deposited onto the surface of the carrier. In both cases, the carrier material on which the chromium compound has been deposited is subsequently heated in the presence of molecular oxygen to oxidize at least a part of the chromium content into chromium oxide wherein at least part of the chromium is hexavalent Most of the common organic solvents can be used as the organic liquid from which the chromium-containing compound is deposited onto the carrier material. Examples of suitable liquids having up to 10 carbon atoms per molecule include aromatic hydrocarbons such as benzene, the xylenes, toluene, naphthalene, cumene, the cymenes or ethylbenzene, aliphatic hydrocarbons, particularly paraffins such as propane, butane, pentane, hexane and higher paraffins, refined (i.e., sulfur-free) petroleum distillates, halogenated hydrocarbons such as carbon tetrachloride and chloroform, fully hydrogenated heterocyclic compounds such as tetrahydrofuran, and aliphatic ethers such as diethyl ether or higher ethers. It will be apparent that the suitability of any particular organic solvent will depend largely on whether the chromium is to be deposited onto the carrier material by impregnation or by precipitation. It will further be apparent that the solvent should preferably be one which is readily vaporizable without residue formation.

In the case of the deposition of the chromum-containing compound onto the carrier material by impregnation, in general any chromium organic compound which is sufficiently soluble in dry organic solvents can be used, provided that it can be decomposed by heat and oxygen, at least partially into chromium oxide wherein at least part of the chromium is hexavalent. Suitable compounds are the alkyl or aryl (e.g., up to 10 carbon atoms per aryl group) esters of chromic acid, particularly the lower alkyl esters in which the alkyl radical has from 1 to 6 carbon atoms. These are prepared by reacting the appropriate alcohol with chromium trioxide. Other compounds which can be used include chromium acetyl acetonate and chromium arene complexes described by Zeiss in "Organo-Metallic Chemistry," A.C.S. Monograph No. 147, chapter 8, page 380; Reinhold Publishing Corporation. The propyl, butyl and amyl esters of chromic acid are particularly preferred compounds for use in this method of preparation. Most of the common organic solvent listed above may be used for solution of the organic chromium compound, and the use of the lower aromatic hydrocarbons such as benzene, the xylenes and toluene, and the aliphatic hydrocarbons including paraffins and refined petroleum distillates is particularly preferred. Solvents containing olefinic linkages are generally less satisfactory, and the ether solvents are not suitable for use with the chromate esters. After impregnation excess solvent can be removed by decantation and/or evaporation.

In one embodiment of the present invention the carrier material is impregnated with an anhydrous solution of chromic trioxide in an organic solvent, for instance chloroform or a fatty acid anhydride, e.g., acetic anhydride, either alone or mixed with a large excess of carbon tetrachloride. The preferred method is to dissolve the chromium trioxane in the minimum amount of acetic anhydride, followed by dilution with carbon tetrachloride. The impregnated carrier material is subsequently heated in a molecular oxygen-containing gas.

In the case of the deposition of the chromium-containing compound onto the carrier material by precipitation, in general, any chromium compound can be used which is soluble in a dry organic liquid and which can be precipitated from such a solution in the form of a chromium compound which is at least partially convertible to the hexavalent chromium oxide by heating in the presence of molecular oxygen. As an example of this method, chromyl chloride is reacted with an ester of an inorganic acid in solution in an anhydrous organic liquid, forming a precipitate of a chromium-containing compound which deposits on the carrier. The inorganic ester can be an alkyl or aryl (up to 10 carbon atoms per alkyl or aryl group) ester of an inorganic acid. Generally the lower alkyl esters having from 1 to 6 carbon atoms in the alkyl radical, are preferred, and the methyl and ethyl esters of the acids are particularly suitable. The ester can be derived from a wide variety of inorganic acids, including silicic, phosphoric, titanic, molybdic, phospho-tungstic, boric, fluoboric acids, and the mixed hetero-poly acids. The use of the lower alkyl esters of silicic acid is preferred, particularly tetra-ethyl orthosilicate. Examples of other suitable esters are: tricresyl orthophosphate, tetra(n-butyl)titanate, and trimethyl orthoborate. Most of the common organic solvents listed above can be used as the organic liquid from which the precipitation takes place. Aliphatic hydrocarbons, especially paraffins or refined petroleum distillates, and halogenated hydrocarbons such as carbon tetrachloride, are preferred solvents. As described below, aromatic hydrocarbon solvents react with chromyl chloride and hence are preferably not used as the anhydrous organic liquid from which the deposition takes place. The preparation of the catalyst can be suitably carried out by suspending the carrier material in the anhydrous organic liquid, adding the chromyl chloride and inorganic ester and allowing reaction to take place with the result that the chromium compound which precipitates is deposited on the suspended carrier material. The organic liquid is then removed by evaporation.

Another example of the deposition of the chromium-containing compound onto the carrier material by precipitation is the reaction of chromyl chloride with an aromatic hydrocarbon, such as benzene, xylene, naphthalene, anthracene, phenanthrene, ethylbenzene or cymene, in solution in an anhydrous organic liquid to form a precipitate. In this case the anhydrous organic liquid is suitably not an aromatic hydrocarbon, and preferred organic liquids include hydrocarbons such as paraffins or refined petroleum distillates and halogenated compounds such as carbon tetrachloride. The preparation of the catalyst can be suitably carried out by suspending the carrier material in the dry organic liquid, adding the chromyl chloride and aromatic hydrocarbon and allowing reaction to take place with the result that the chromium compound which precipitates is deposited on the suspended carrier material. The organic liquid is then removed by evaporation.

After deposition of the chromium compound onto the carrier, whether by impregnation or by precipitation and removal of solvent, the catalyst is heated in the presence of a molecular oxygen-containing gas to oxidize at least part of the chromium content into the hexavalent form and to activate the catalyst. The temperatures employed in the heating step can vary between wide limits for example between 200 and 1000° C., and usually between 200 and 850° C. It is a particular feature of the catalysts of the present invention that it is unnecessary to use very high activation temperatures, such as are needed to dry the catalyst when an aqueous impregnation technique has been used.

The invention is illustrated further with reference to the following examples.

Example I

A conventional catalyst was prepared by impregnating a silica carrier, "Aerosil 380," with aqueous chromic oxide, and a second catalyst by impregnating the same carrier with a benzene solution of tertiary-butyl chromate. After removal of solvent by evaporation by blowing a dry inert gas through the mixture both of the solid products were activated by heating in a stream of dry oxygen at 620–630° C. Polymerization tests were then carried out in a low-pressure system, where the rate of polymer formation from ethylene at 130° C. and 40 mm. pressure were measured. Results are shown in Table I, all measurements being made using the same batch of ethylene. "Aerosil 380" is a highly dispersed silica of high purity, of sub-micron particle size and of high surface area but essentially nonporous and is made by hydrolysis of a silicon halide in a flame. The material is manufactured by Degussa at Rheinsfelden, Germany. "Aerosil" is a registered trade mark.

TABLE I

| Impregnation | With aqueous chromic acid | With benzene solution of t-butyl chromate | |
|---|---|---|---|
| | | 1 | 2 |
| CrO³ content after activation, wt. percent | 0.31 | 0.35 | 0.34 |
| Ethylene polymerization rate, mg./g. catalyst/min | 9.4 | 22.1 | 22.3 |

Two different preparations of the t-butyl chromate catalyst were used in these tests. In both cases, substantial increases in polymerization rate were obtained.

Example II

A similar comparison using a catalyst of rather higher chromium content was made, the method of test and of catalyst preparation being the same as in Example I. Results are shown in Table II.

TABLE II

| Impregnation | With aqueous chromic acid | With benzene solution of t-butyl chromate |
|---|---|---|
| CrO³ content after activation, wt. percent | 1.6 | 0.5 |
| Ethylene polymerization rate, mg./g. catalyst/min | 32.5 | 43.3 |

In both these examples the catalysts prepared by impregnation with benzene solutions of the t-butyl chromate showed activities per unit of chromium content which were very much higher than for the conventional catalysts. Consequently, reasonably high polymerization rates can be achieved at much lower chromium contents with the butyl chromate catalysts.

Example III

A silica gel base (Davison High Pore Volume microspheroidal silica gel) was dried at 900° C. in a stream of dry air. This base was then mixed with a solution of tertiary butyl chromate in benzene in such proportions that the final catalyst contained 2 percent of chromium by weight as chromium trioxide. The benzene was then removed in a stream of dry air and the impregnated base divided into portions which were separately heated in a stream of dry oxygen at a series of different temperatures in the range 400–1000° C. The time of heating was five hours.

The catalysts so prepared were charged to a stirred pressure reactor with pure dry cyclohexane solvent (0.1 gm. catalyst to 300 gm. solvent). Dry ethylene containing 3 percent of propylene (free of oxygen and acetylenic impurities) was then admitted, the reaction temperature being 125–130° C. and the pressure 450 lb./sq. in. gauge. In each run polymer production rate as gm. per gm. of catalyst per hour was measured, the results being shown in Table III.

TABLE III

| Run No. | Temperature of Oxygen Treatment, ° C. | Polymer Production Rate, gm./gm. catalyst/hour |
|---|---|---|
| 1 | 400 | 547 |
| 2 | 500 | 532 |
| 3 | 620 | 816 |
| 4 | 750 | 902 |
| 5 | 850 | 1,088 |
| 6 | 850 | 1,032 |
| 7 | 1,000 | 1,000 |

Very active catalysts were obtained, even at the lowest oxygen treatment temperature. Reduction of the oxygen treatment time from five hours to one hour still produced good catalysts, and even shorter oxygen treatment times can be used. Oxygen treating temperatures below 400° C. can also be used, although, obviously, the higher temperatures give catalysts of higher activity.

*Example IV*

A silica carrier material, "Aerosil 380," was suspended in a carbon tetrachloride solution of tetra-ethyl orthosilicate, and chromyl chloride was added. The chromyl chloride reacted with the ethyl silicate on warming gently, precipitating the solid reaction product onto the Aerosil. The solvent was then removed by evaporation by blowing a stream of dry nitrogen through the mixture and the solid catalyst activated in a stream of dry oxygen at 620–630° C. The polymerization activity of the catalyst so obtained was compared in low pressure tests at 130° C. and 40 mm. ethylene pressure with that given by the same Aerosil impregnated with aqueous chromic acid, results being shown in Table IV.

TABLE IV

|  | Catalyst impregnated with aqueous chromic acid | Catalyst from tetra-ethyl silicate and chromyl chloride |
|---|---|---|
| $CrO_3$ content of catalyst after activation, wt. percent | 1.6 | 1.0 |
| Ethylene polymerization rate, mg./g. catalyst/min | 32.5 | 44 |

This example shows therefore an increase in the catalyst activity per unit of chromium in a catalyst prepared according to the present invention compared with a catalyst prepared in the usual way.

*Example V*

35 gm. of silica gel (Davison 968, Grade S) were dried in a stream of dry air at 400° C. 1.1 gm. of chromic oxide ($CrO_3$) was dissolved in the minimum amount of acetic anhydride (about 20 ml.), and this solution then mixed with carbon tetrachloride. The dried silica gel was stirred with this solution, and the carbon tetrachloride and some of the acetic anhydride distilled off. The remaining solvent was then removed by heating under vacuum to about 100° C. The solid product was then activated by heating to 300–320° C. for seven hours in a stream of dry air.

A stirred jacketed autoclave was charged with 0.67 gm. of this catalyst, and 300 gm. of dry cyclohexane, and the temperature raised to 129° C. A gas mixture containing 95 volume percent of ethylene and 5 volume percent of propylene was then forced into the autoclave, and the pressure maintained at 450 lbs./sq. in. gauge for 1 hour, the temperature being kept constant at 129° C. After one hour the pressure was released and solvent and unreacted monomer flashed off from the polymer. A quantity (30 gm.) of solid polymer remained in the reactor.

Ethylene homopolymers and ethylene-propylene copolymers were made in these polymerizations; the catalysts are also effective in preparing homopolymers or copolymers of other α-olefins, e.g., propylene, butene-1, pentene-1 and the like.

When the above examples are repeated using catalysts prepared with other types of carrier material, including silica/alumina and alumina supports, and with other organic liquids including xylene, toluene, paraffins, refined petroleum distillates, carbon tetrachloride and diethyl ether, employing both the impregnation and precipitation techniques, similar results are obtained. Thus a solution of diphenyl chromate can be used to impregnate a silica-alumina gel; or tetra(n-butyl) orthotitanate can be reacted with chromyl chloride in a p-xylene medium to precipitate a chromium-containing solid on the surface of a silica-alumina gel.

The terms "dry" and "anhydrous" as applied herein to gas (e.g., oxygen) used to activate the catalyst, have the same significance as in U.S. Patent 2,825,721 (1958). As applied to the organic solvents for chromium compounds, they mean that no aqueous phase is present; preferably the solvent is maintained as nearly water-free as is practical by the use of the drying procedures known in the art.

As disclosed in Patent 2,825,721, the polymerization of olefins in the presence of a supported chromium oxide catalyst is conducted at a temperature in the range 100° to 500° F., usually 150° to 375° F. The chromium content of the final catalyst can be up to 50 weight percent, but is usually in the range 0.1 to 10 weight percent. The hexavalent chromium content is preferably at least 0.1 weight percent.

I claim:

1. A process of preparing a polymerization catalyst which comprises contacting a carrier material with a solution of chromium-containing compound in anhydrous organic solvent, depositing a chromium compound which is at least partially convertible to chromium oxide on heating in the presence of elemental oxygen, onto said carrier material under substantially anhydrous conditions by evaporating said solvent or precipitating said chromium compound from solution by chemical reaction, and subsequently heating the resulting composite in the presence of elemental oxygen and thus converting the chromium compound to chromium oxide wherein at least part of the chromium is hexavalent.

2. A catalyst preparation process which comprises impregnating a support selected from the group consisting of silica, alumina, and silica-alumina with a solution of a chromium compound in a solvent, said chromium compound being selected from the group consisting of chromium trioxide, aryl esters of chromic acid wherein each aryl group contains up to 10 carbon atoms, alkyl esters of chromic acid wherein each alkyl group contains from 1 to 6 carbon atoms, chromium acetyl acetonate, and chromium arene complexes, said solvent being selected from the group consisting of aromatic hydrocarbons, aliphatic hydrocarbons, refined petroleum distillates, carbon tetrachloride, chloroform, tetrahydrofuran, aliphatic ethers, and fatty acid anhydrides, said solvent containing up to 10 carbon atoms per molecule; the impregnation being conducted under substantially anhydrous conditions; and heating the resulting solid in dry oxygen-containing gas at a temperature in the range 200° to 1000° C. to convert the chromium to oxide wherein at least part of the chromium is hexavalent.

3. A process according to claim 2 wherein said support is silica, said chromium compound is tertiary-butyl chromate and said solvent is benzene.

4. A process according to claim 2 wherein said support is silica, said chromium compound is chromium trioxide and said solvent is a mixture of carbon tetrachloride and acetic anhydride.

5. A process according to claim 2 wherein said support is silica-alumina, said chromium compound is diphenyl chromate and said solvent is toluene.

6. A catalyst preparation process which comprises precipitating, on a carrier material selected from the group consisting of silica, alumina, and silica-alumina, a chromium-containing precipitate formed by reacting chromyl chloride with a compound selected from the group consisting of benzene, the xylenes, naphthalene, anthracene, phenanthrene, ethylbenzene, the cymenes, and the alkyl and the aryl esters of acids of the group consisting of silicic acid, phosphoric acids, titanic acids, molybdic acid, phosphotungstic acid, boric acids, fluoboric acid, and the mixed heteropoly acids, each such alkyl or aryl group containing up to 10 carbon atoms per molecule; the precipitation being conducted in the presence of a solvent selected from the group consisting of aromatic hydrocarbons, aliphatic hydrocarbons, refined petroleum distillates, carbon tetrachloride, chloroform, tetrahydrofuran, aliphatic ethers and fatty acid anhydrides, said solvent containing up to 10 carbon atoms per molecule; the precipitation being conducted under substantially anhydrous conditions; separating said solvent from the carrier having chromium compound deposited thereon; and heating the separated carrier-precipitate composite in the presence of a dry oxygen-containing gas at a temperature in the range 200° to 1000° C. to convert the chromium to oxide wherein at least part of the chromium is hexavalent.

7. A process according to claim 6 wherein said carrier is silica, said ester is tetraethyl orthosilicate, and said solvent is carbon tetrachloride.

8. A process according to claim 6 wherein said carrier is silica-alumina, said ester is tetra(normal-butyl)orthotitanate and said solvent is para-xylene.

9. A process which comprises polymerizing an aliphatic 1-olefin having from 2 to 8 carbon atoms per molecule and no branching nearer the double bond than the 4-position, at a temperature within the range 100 to 500° F. in the presence of a catalyst prepared in accordance with claim 1.

10. A process which comprises polymerizing ethylene to solid polymer, at a temperature in the range 150 to 375° F., in the presence of a catalyst prepared according to claim 3.

11. A process which comprises copolymerizing ethylene and propylene to solid copolymer, at a temperature in the range 150 to 375° F. in the presence of a catalyst prepared according to claim 4.

12. A process which comprises polymerizing ethylene to solid polymer, at a temperature in the range 150 to 375° F., in the presence of a catalyst prepared in accordance with claim 7.

13. A catalyst prepared according to claim 1.

References Cited

UNITED STATES PATENTS 2,825,721  3/1958  Hogan _____ 260—94.9

FOREIGN PATENTS 594,956  3/1961  Belgium.

JOSEPH L. SCHOFER, Primary Examiner.

F. L. DENSON, M. KURTZMAN, Assistant Examiners.